Dec. 8, 1970   R. R. HOCQ   3,545,905
GAS LIGHTER WITH CONCEALED OPERATING MECHANISM
Filed March 26, 1969   18 Sheets-Sheet 18
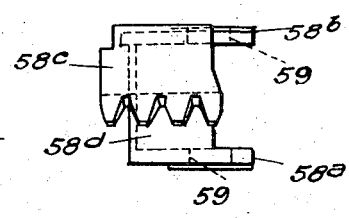
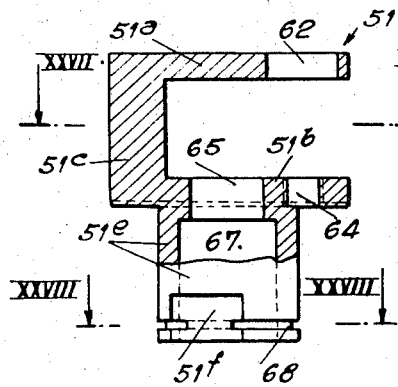
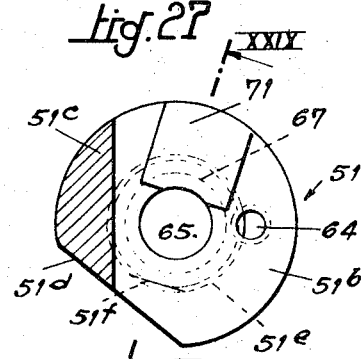
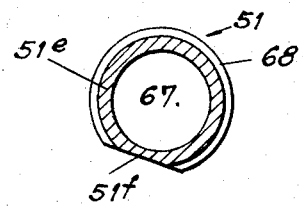
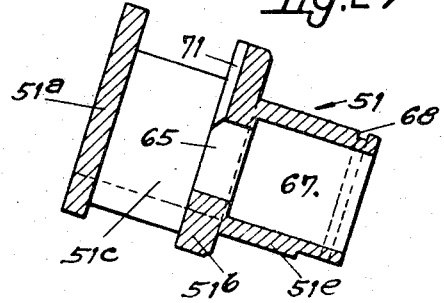

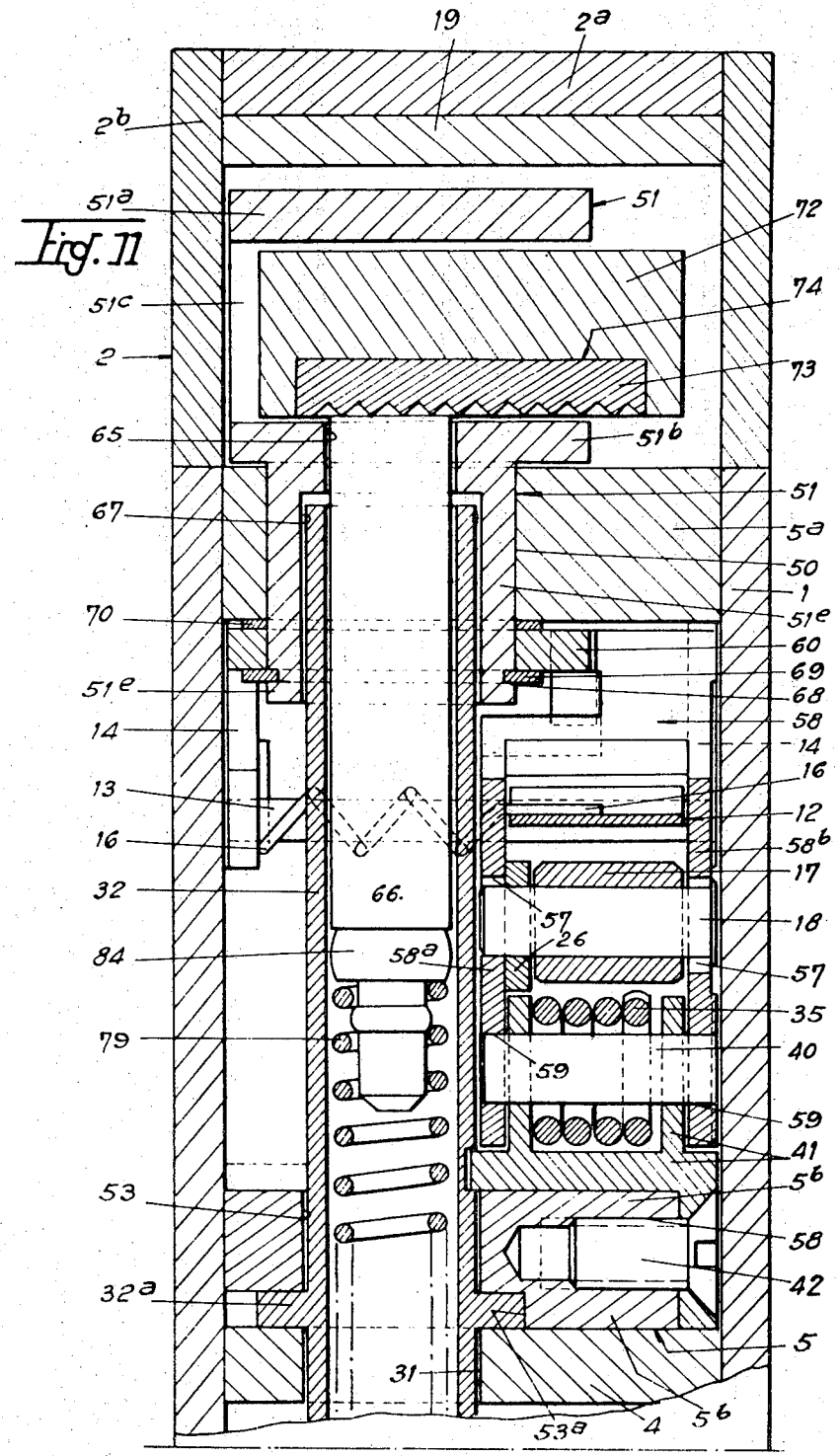

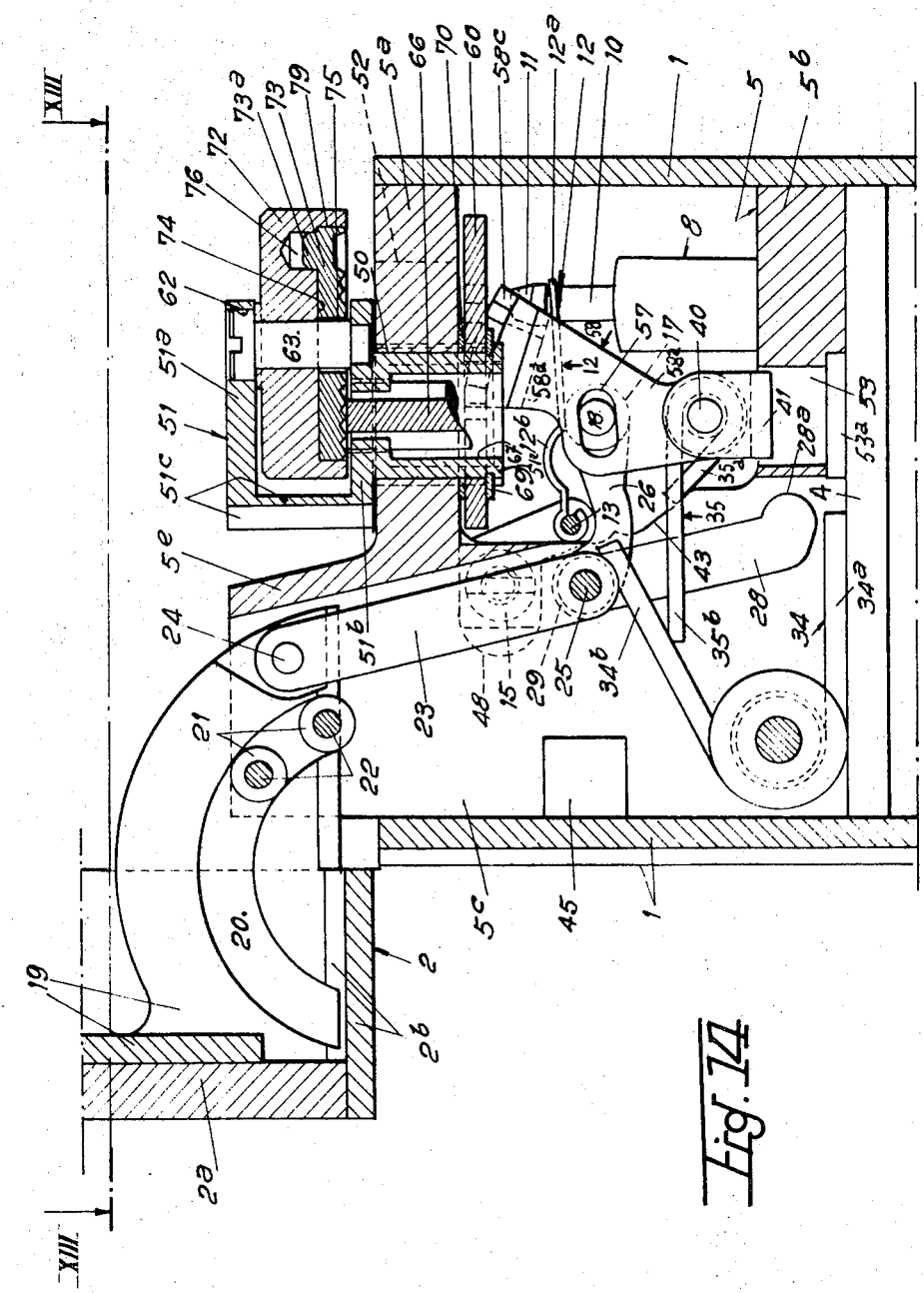

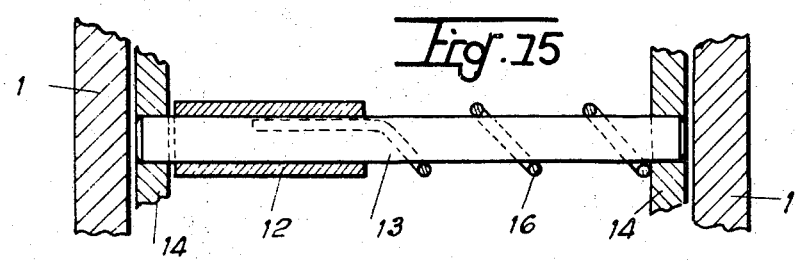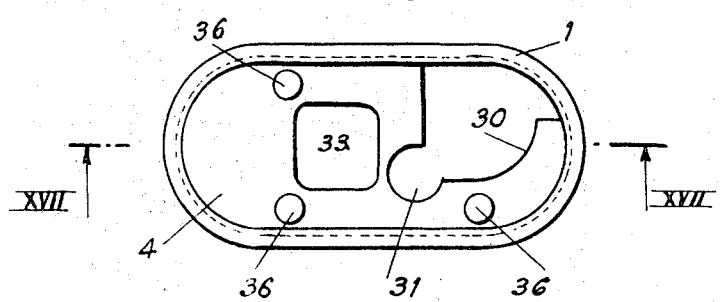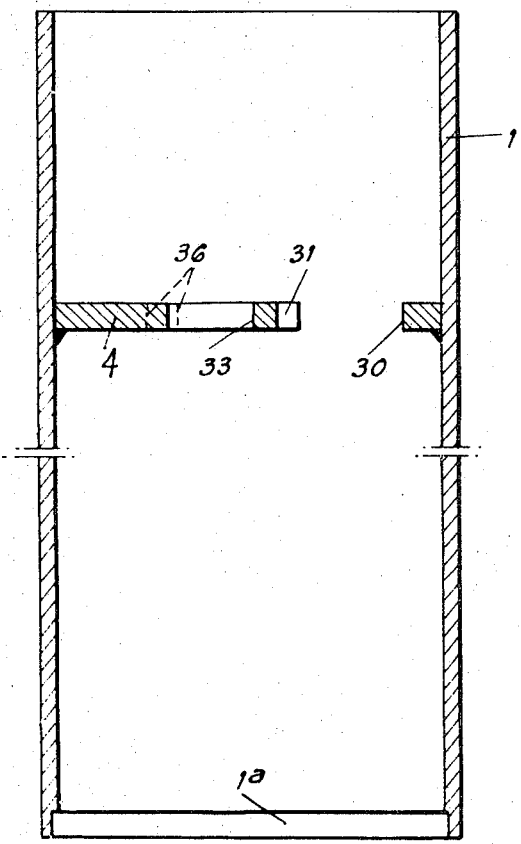

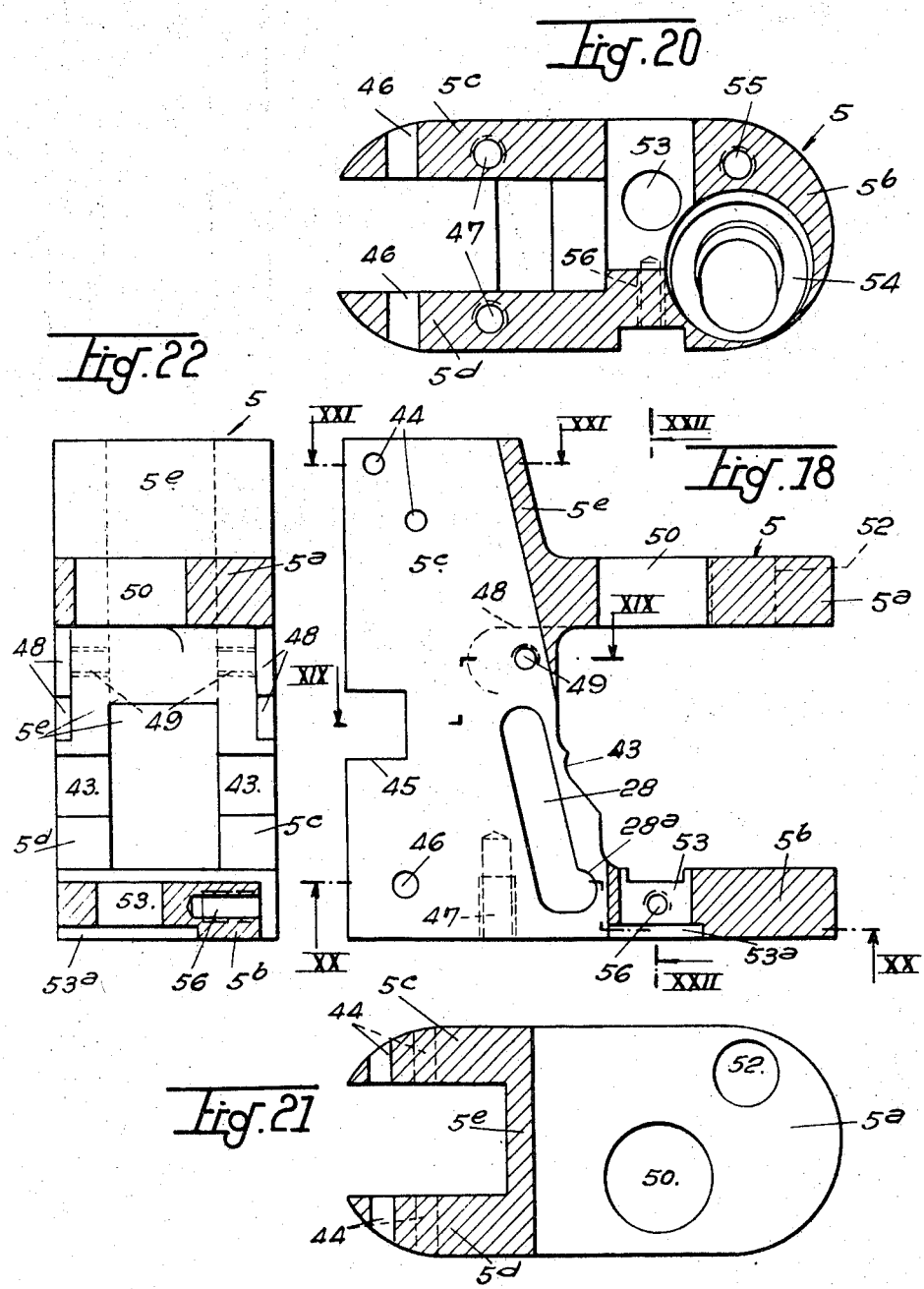

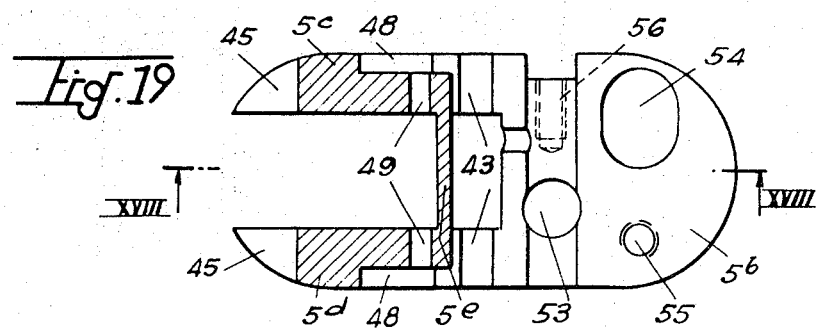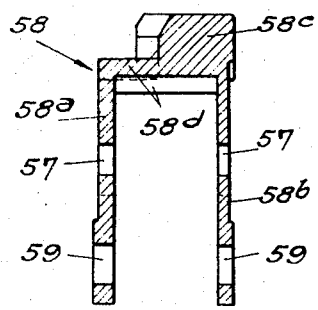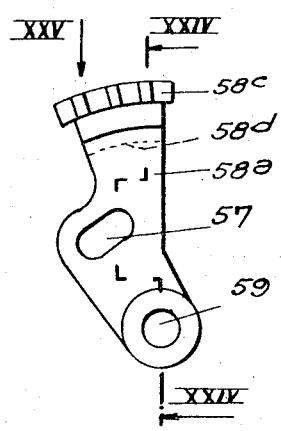

United States Patent Office 3,545,905
Patented Dec. 8, 1970

3,545,905
GAS LIGHTER WITH CONCEALED OPERATING MECHANISM
Robert Raymond Hocq, Boulogne-Billancourt, France, assignor to Societe Franco-Hispano-Americaine Francispam, Paris, France, a corporation of France
Filed Mar. 26, 1969, Ser. No. 810,531
Claims priority, application France, Mar. 29, 1968, 146,320
Int. Cl. F23q 2/16
U.S. Cl. 431—131          7 Claims

ABSTRACT OF THE DISCLOSURE

A gas-lighter having concealed operating mechanism responsive to opening of the hinged cap of the lighter, said operating mechanism effecting, simultaneously, lifting of the valve burner head to permit passage of combustible gas through the valve and movement of a driver, which carries a flint-wheel and which is both invisible and inaccessible to the user whilst the lighter cap is closed, to a position thereof in which part of the periphery of said driver projects outwardly from the lighter body and thereby becomes accessible for actuation by the user's thumb.

---

The present invention relates to a gas lighter with concealed operating mechanism and the following description discloses a very luxurious lighter which has none of the usual disadvantages of gas lighters. In particular, all of the parts which normally project and spoil the aesthetic shape of a gas lighter by breaking the geometrical continuity of the external contours have been made invisible without impairing any of the functions to be performed by a gas lighter.

This result is achieved by, inter alia, employing for the lid or cover of the lighter an invisible hinge of the general construction described and illustrated in my co-pending patent application No. 706,824 filed February 20, 1968, opening of said lid or cover causing a valve lever to pivot and allow gas to issue and simultaneously bringing into the working position thereof a driver for the serrated flint-wheel which produces sparks from a flint to cause ignition of the gas. For this purpose, a set of jointed connecting links is provided so as to control the valve lever on the one hand and, on the other hand, an assembly of a toothed sector and a pinion integral with a driver-carrier into which the driver and the flint-wheel are fixed.

A gas lighter constructed in accordance with the present invention offers a number of advantages. Firstly, when the lighter is closed, neither the flint-wheel driver nor the end of the hinge pin is visible and, when the lighter is open, the flint-wheel is so disposed that the user's finger cannot come directly into contact with it and that it is not visible. Secondly, all the manipulations necessary for using the lighter can be carried out without any difficulty, and the functioning of the mechanisms which are actuated is perfectly reliable becase of their simplicity.

More precisely, the present invention consists in a gas lighter control mechanism which is actuated by the opening of the lid or cover thereof and which is completely invisible when the lighter is closed, comprising an invisible hinge constituted by a fixed block, integral with the lighter, and carrying guide-rollers, a moving block, integral with the lighter cover and having two curved guide-grooves for the rollers, two connecting links, pivoted at one end to this moving block and joined together at their other ends by a spindle forming a distance piece, and two springs wound around fixed pins, integral with the fixed block, and co-operating with the aforesaid distance-piece spindle so as to lock this spindle in its two extreme positions of fully opened and fully closed when the cover, under the action of the user's finger, has crossed the dead-centre position of the connecting links, and further comprising a gas reservoir, a release valve carried by said reservoir, a pivoting valve lever for opening the obturator or plug of this valve and thus allowing gas to pass, a flint contained within a flint-holder tube, and a serrated flint-wheel capable of rubbing upon said flint so as to produce sparks and ignite the gas issuing from the valve, a connecting link pivoted at one end at the aforesaid distance-piece spindle and co-operating, through the intermediary of a spindle pivoted at its other end and carrying a roller, with a curved slot formed in a toothed sector pivoted about the pin for the first of the aforesaid springs, the said toothed sector being in constant engagement with a pinion integral with a driver-carrier which pivots relative to the aforesaid fixed block, the said driver-carrier thus being capable of passing, by pivoting, from one position, retracted beneath the lighter cover to a partially exposed position in which a driver is capable of being operated by the user's finger so as to cause the serrated flint-wheel carried by the driver to rub against the flint, and the aforementioned roller being placed, relative to the valve lever, in such a manner as to cause this latter to pivot upwards about its spindle against the action of a spring coiled around the said spindle, so as to lift the burner head, which forms part of the valve, and thus to permit the gas to issue.

In one embodiment of such a gas lighter, the fixed block is constituted by a platform pierced with openings for the passage of various components and comprising two vertical webs and two horizontal shelves, and the webs carry, in particular, the hinge guide rollers, brackets for supporting the valve-lever spindle and the pin for the second of the aforementioned springs which act upon the distance-piece spindle. Preferably, the lighter body is divided into two parts by a horizontal partition to which the aforesaid platform is fixed.

Furthermore, the toothed sector preferably comprises two webs parallel to the webs of the platform, and the teeth are formed on a cylindrical part of the surface having the pivot of the sector as its axis, whilst the pinion has the form of a more or less oval plate having only a few teeth over a short part of its periphery.

Turning to the driver-carrier, this may have an upper part of relatively large dimensions comprising two horizontal limbs which leave space between themselves for the driver and which are pierced with holes aligned for the passage of a spindle intended for the mounting of this driver, and a lower part, of smaller dimensions, concentric with the upper part and pierced axially for the passage of the flint and a tube which holds it, the two parts of the driver-carrier having, in planes perpendicular to the axis of rotation, circular sections, each of which embodies a flat, the flat upon the outer part being, in the rest position, parallel to one of the long sides of the normal section through the lighter body, whilst the flat on the lower part makes a certain angle with the former and coincides with a corresponding flat in an opening in the aforesaid pinion, this lower part having a peripheral groove to receive a clip for securing the driver-carrier to the pinion, a portion of the lower part above this groove being cylindrical externally so as to register in a cylindrical bore in the upper shelf of the platform, due to which the driver-carrier can pivot freely with the pinion relative to the shelf when the toothed sector causes the pinion to turn.

Said driver will preferably be cylindrical and will have a recess in its base to accommodate the serrated flint-wheel.

Moreover, the valve-lever spring preferably draws the former downwards in such a manner that, in its rest position, it is in contact with a part of the valve and does not hinder the removal and replacement of the reservoir since it coacts with the burner head only in the fully open condition of the lighter.

The present invention will now be more particularly described with reference to the accompanying diagrammatic drawings which illustrate a generally preferred embodiment and in which:

FIGS. 10 to 12 are vertical sections on the lines X—X, XI—XI and XII—XII, respectively, of FIG. 1 or of FIG. 3;

FIG. 14 is a section on the line XIV—XIV of FIG. 13 and shows that part of the lighter which is located above the reservoir and in the open condition thereof;

FIG. 15 is a section of a detail on the line XV—XV of FIG. 1;

FIG. 16 is a section of the lighter body only, on the line XVI—XVI of FIG. 1 or FIG. 3;

FIG. 17 is a section on the line XVII—XVII of FIG. 16;

FIG. 18 is a vertical section of the platform, on the line XVIII—XVIII of FIG. 19;

FIGS. 19 to 22 are horizontal sections on the lines XIX—XIX, XX—XX, XXI—XXI and XXII—XXII, respectively, of FIG. 18;

FIG. 23 is a view in elevation of the toothed sector, in a plane parallel to those of FIGS. 1 and 3;

FIG. 24 is a section on the line XXIV—XXIV of FIG. 23;

FIG. 25 is a view in plan looking in the direction of the arrow XXV of FIG. 23;

FIG. 26 is a part view in elevation of the driver-carrier, part-sectioned in a plane parallel to those of FIGS. 1 and 3;

FIGS. 27 and 28 are, respectively, sections on the lines XXVII—XXVII and XXVIII—XXVIII of FIG. 26; and FIG. 29 is a section on the line XXIX—XXIX of FIG. 27.

Figure 1:
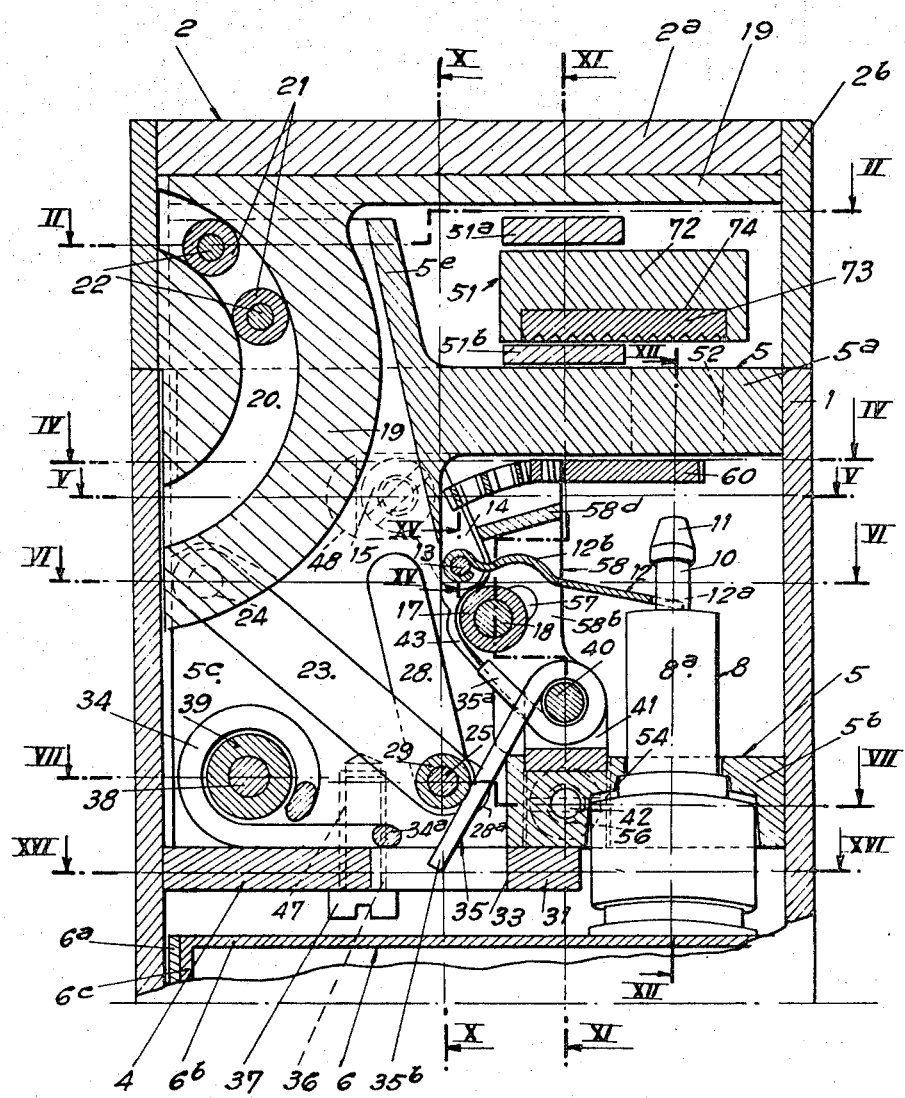
FIG. 1 is a vertical section on the line I—I of FIG. 2 and shows that part of the lighter which is located above the reservoir and in the closed condition thereof.

It can be seen from the drawings that the gas lighter in accordance with the invention has a case which comprises a body 1 (FIGS. 1 to 17) open at its two ends and having the form, in section, of a rectangle whose short sides are replaced by circular arcs having the distance between the long sides as their diameter (FIGS. 2, 4 to 7, 9 and 16), a cap, indicated as an assembly by 2, which is pivotally connected to the body 1 by an invisible hinge of the construction which is described and illustrated in co-pending Patent Application No. 706,824 above referred to, and a base 3 (FIGS. 8 and 9) which is retained in a peripheral seat 1a therefor in the lower end of the body 1 in a manner which will be described hereinafter. The interior of this case is divided into two parts (FIGS. 1, 3, 10 to 12 and 17) by a substantially horizontal partition 4 which supports a platform 5. The lower of said two parts of the case interior contains a removable reservoir 6 made up of a bottom 6a having a base and lateral walls which fit into the lower part of the lighter body 1, and a top 6b provided with a depending skirt 6c which fits into the part 6a and is, for example, soldered to it. The top 6b is pierced by an opening 7 (FIG. 12) in which is permanently housed a valve 8 which is provided with a wick 9 (FIGS. 8 and 12) which dips into the reservoir 6 and with a burner-valve having a stem 10 and a head 11 of larger diameter than that of the stem 10 (FIGS. 1, 3 to 6 and 12). A valve lever 12 (FIGS. 1, 3 to 5, 11, 12 and 14) is arranged to pivot about the axis of a spindle 13 which will be described later, said valve lever having a forked end 12a which makes contact with the stem 10 below the head 11 so as to be operable to lift the head and allow gas to pass through the valve when the user lifts the cap and thereby causes the lever 12 to pivot about said axis in a manner which will be explained later. The spindle 13 is carried by two brackets 14 fixed to the platform 5 by screws 15 and a spring 16, which is wound round the spindle 13 and abuts against the lever 12 and against one of the brackets 14 (FIGS. 3, 5, 11 and 15), biases the lever 12 downwards towards a position in which its forked end 12a is not in contact with the head 11 of the burner, as seen in FIG. 1. In the neighbourhood of the end at which it is linked to the spindle 13, the lever 12 has a portion 12b which is upwardly convex (as seen in FIG. 1) and which is intended to allow the lever to swing fully downwards, when the reservoir 6, and thus the valve 8 with its burners 10 and 11, is changed. The lever 12 is lifted automatically, when the cover 2 is opened, into the positions thereof which are illustrated in FIG. 14 by a roller 17 mounted on a spindle 18, in a manner which will be described later. The upwardly convex part 12b of said lever allows the lever 12 to conform precisely to the radius of curvature of the roller 17 in its rest position. It is unnecessary, when the reservoir is being inserted and removed from the base of the lighter, to open the cover 2 in order to carry out these operations, as will be seen hereinafter.

Figure 2:
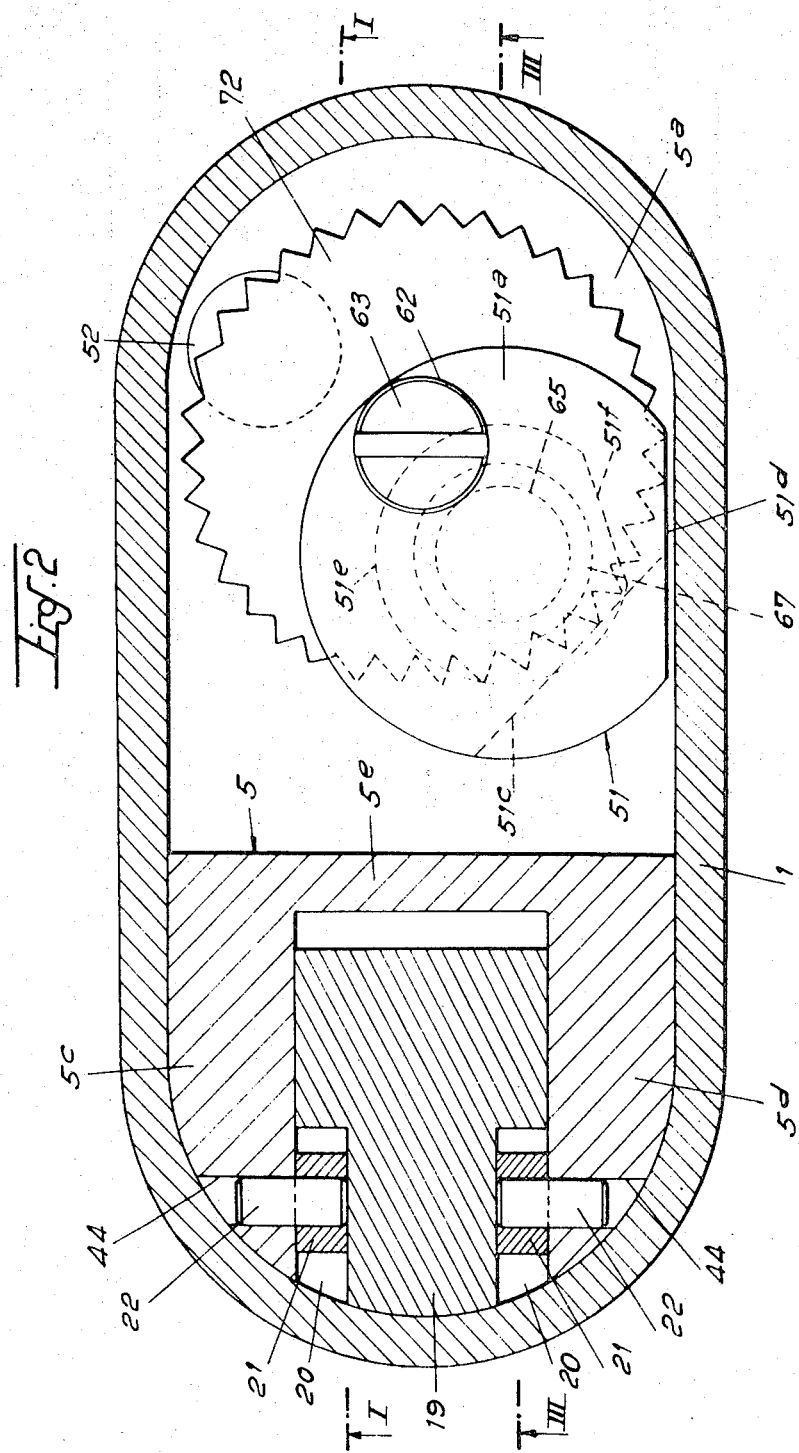
FIG. 2 is a horizontal section on the line II—II of FIG. 1 or of FIG. 3.
Figure 3:
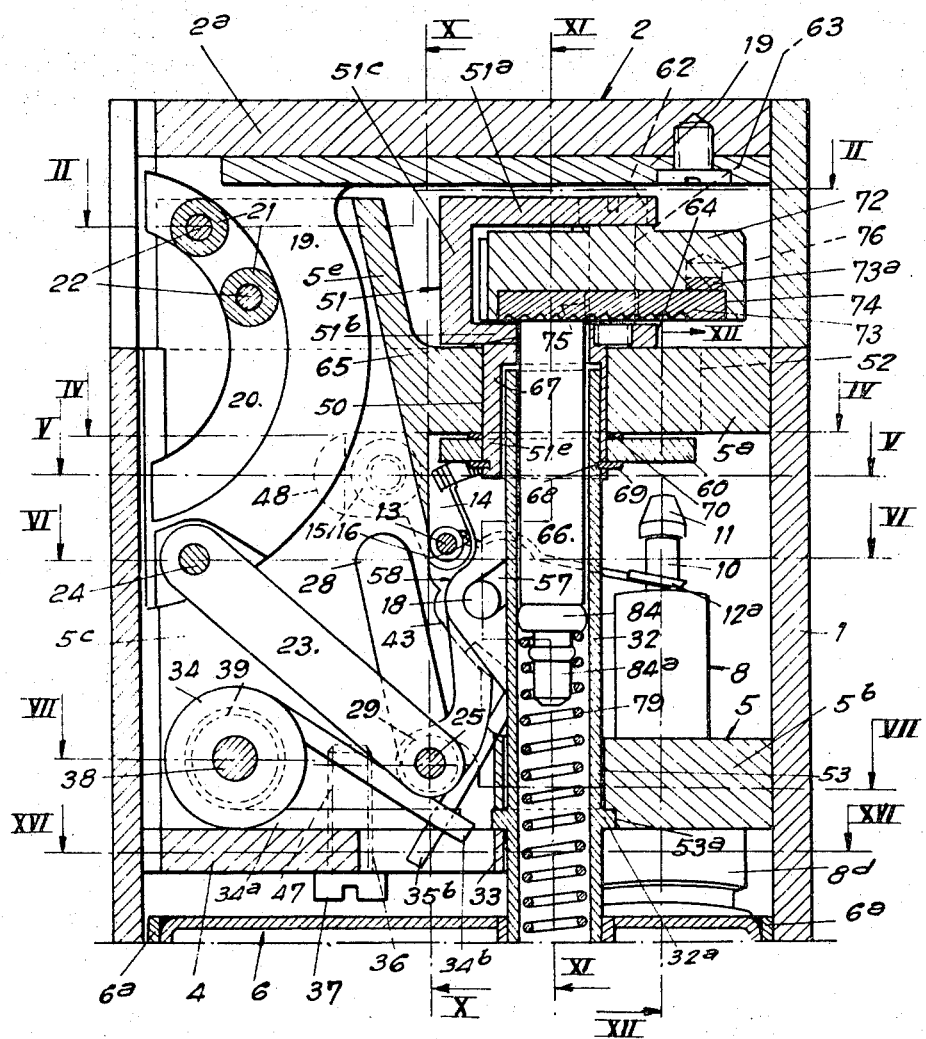
FIG. 3 is a vertical section on the line III—III of FIG. 2.
Figure 4:
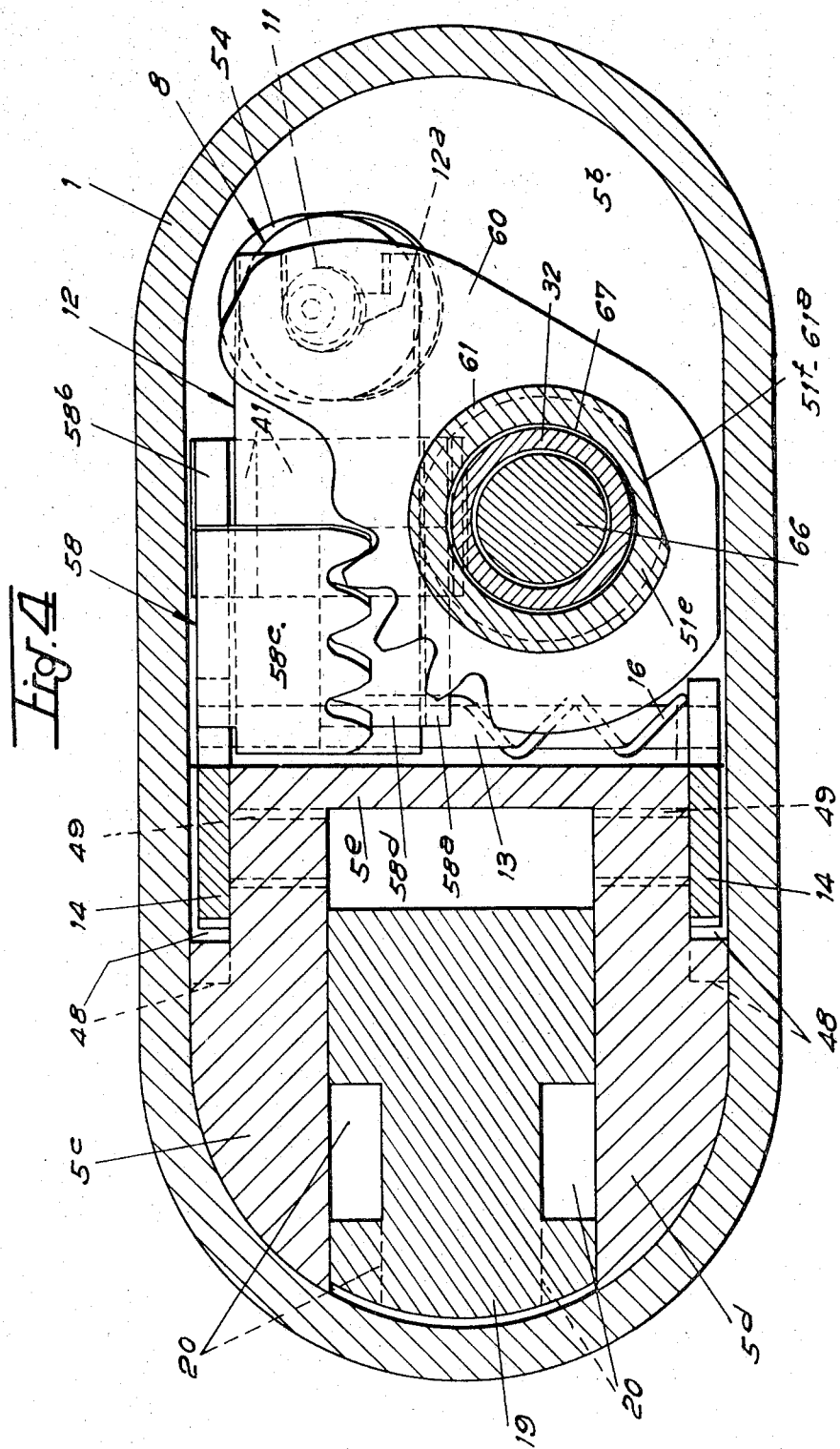
FIGS. 4 to 7 are horizontal sections on the lines IV—IV, V—V, VI—VI and VII—VII, respectively, of FIG. 1 or of FIG. 3, the valve lever having been omitted in FIG. 6.
Figure 5:
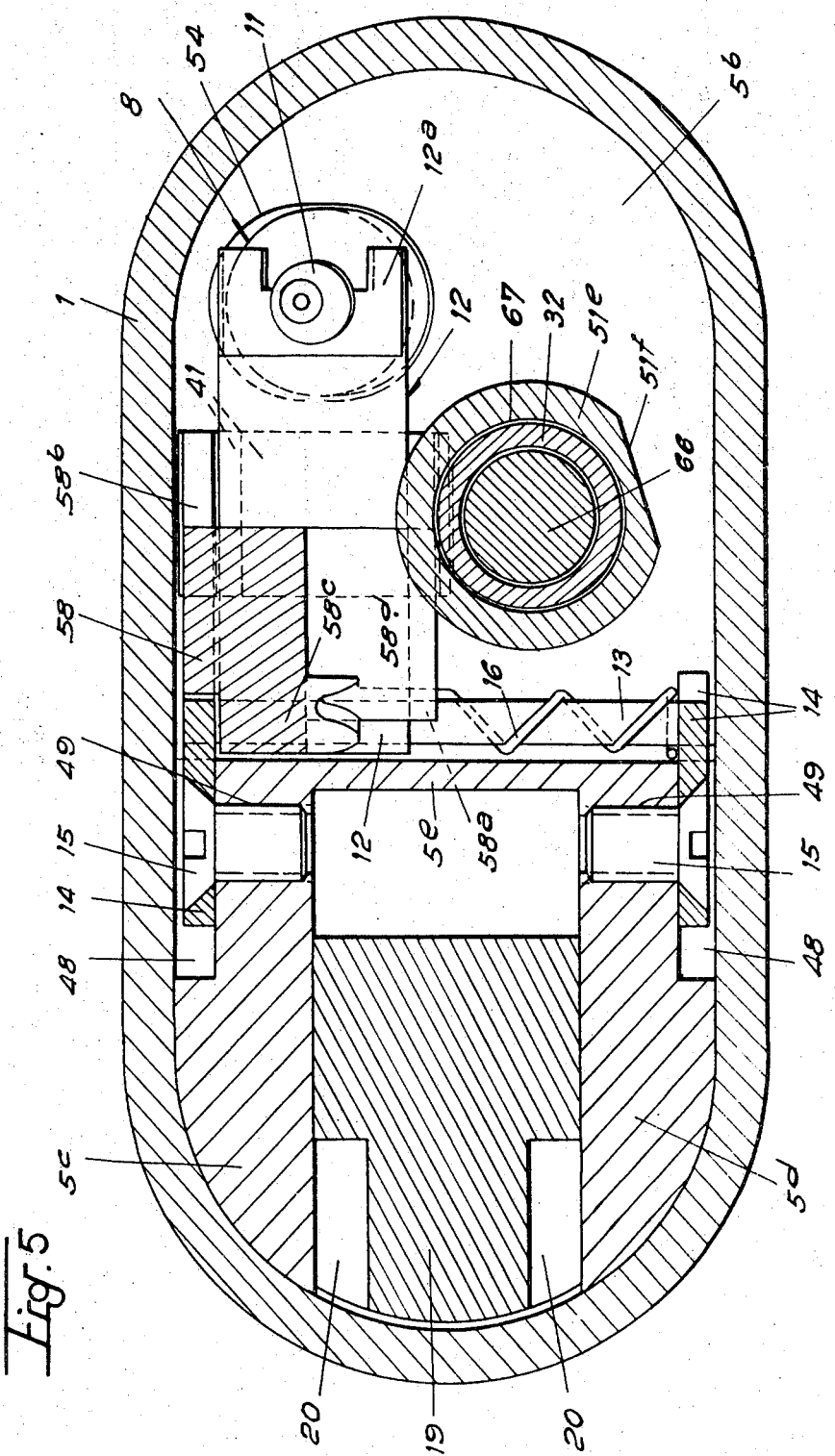

The cap 2 comprises a top 2a and a peripheral flange 2b. The cap is pivotally connected to the body 1 by a hinge which comprises, as described in said patent application, a block 19 fixed, for example, by screws, to the top 2a (FIGS. 1, 3, 10, 13 and 14) and having formed in each of its parallel faces (namely, those faces which are also parallel to the plane of the paper on which FIGS. 1, 3 and 14 are drawn) a curved groove 20 in which two guide-rollers 21 can roll, mounted upon spindles 22 carried by the platform 5, that is to say, in practice, integral with the body 1 of the lighter (FIGS. 1 to 3 and 14). Each of two connecting links 23 is pivotally connected at one end thereof (FIGS. 1, 3, 6, 10 and 14) by a pivot-pin 24 arranged upon the block 19, and at the other end thereof by a spindle 25 (FIGS. 1, 3, 7, 10 and 14) to a further connecting link 26 whose function will be explained later.

The spindle 25 carries two rollers 27 at its ends (FIGS. 6, 7 and 10) which roll in slots 28 in the platform, and the connecting links 23 and 26 are separated from each other by distance pieces 29, threaded over the spindle 25 (FIGS. 1, 3, 6, 7, 10 and 14).

Figure 6:
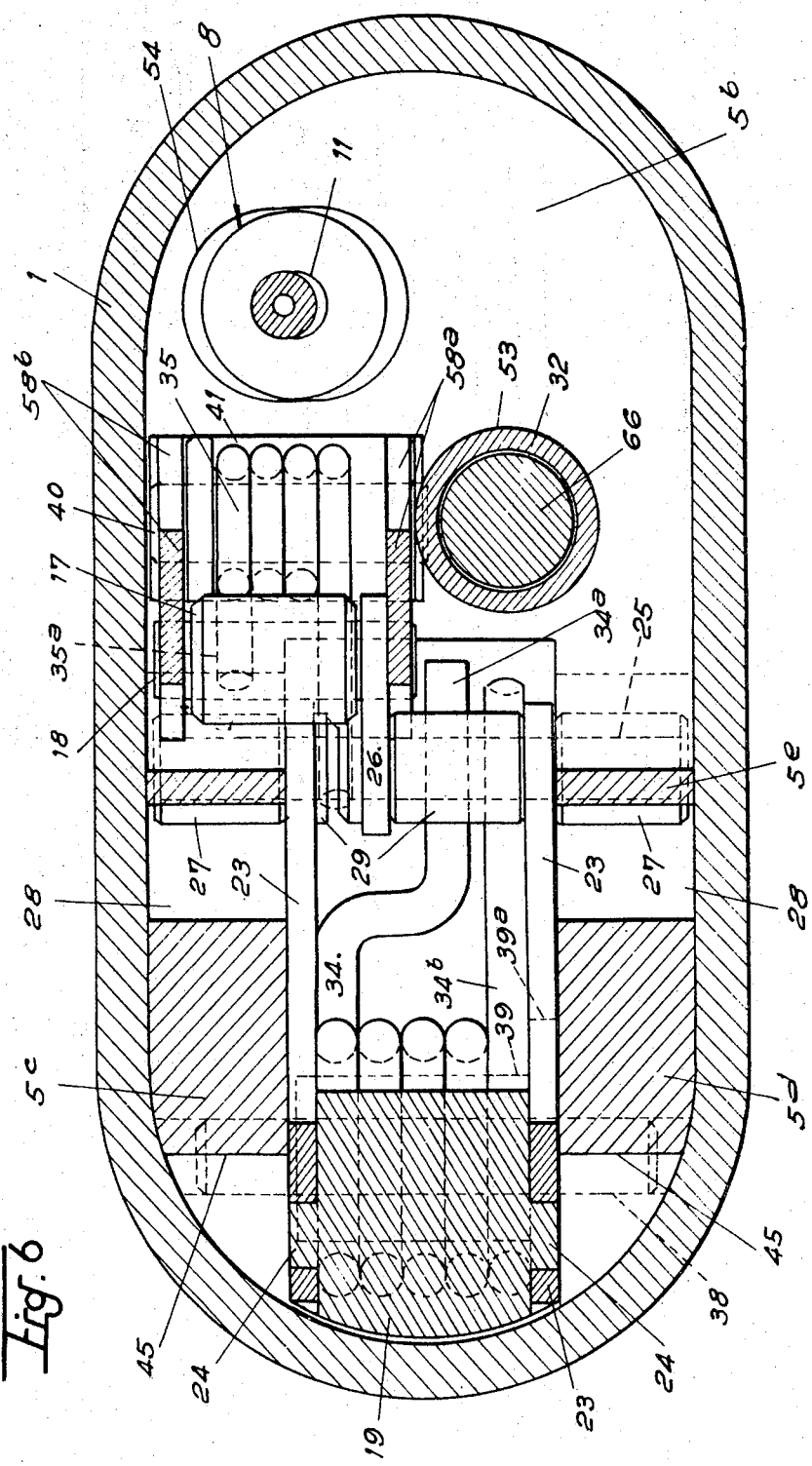
Figure 7:
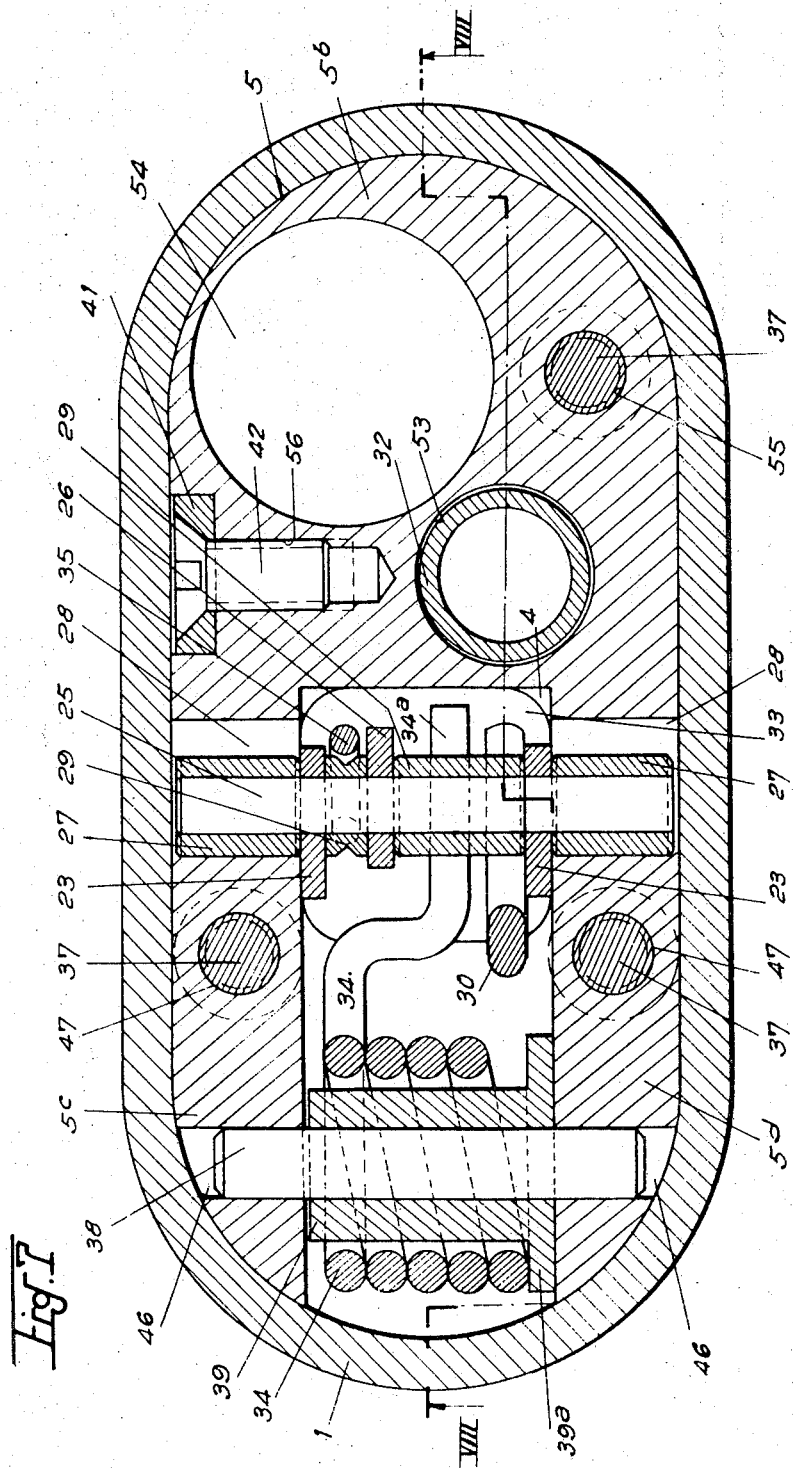
Figure 10:
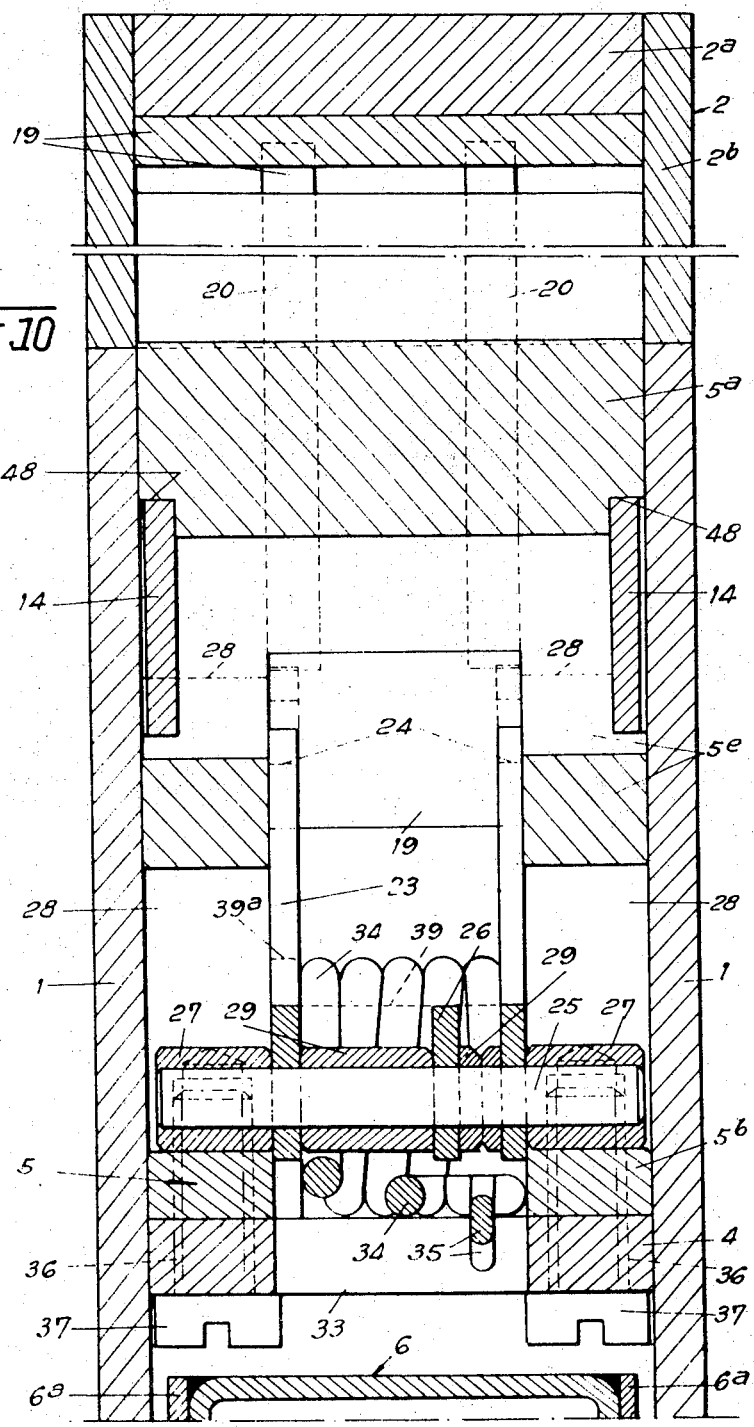
Figure 72:
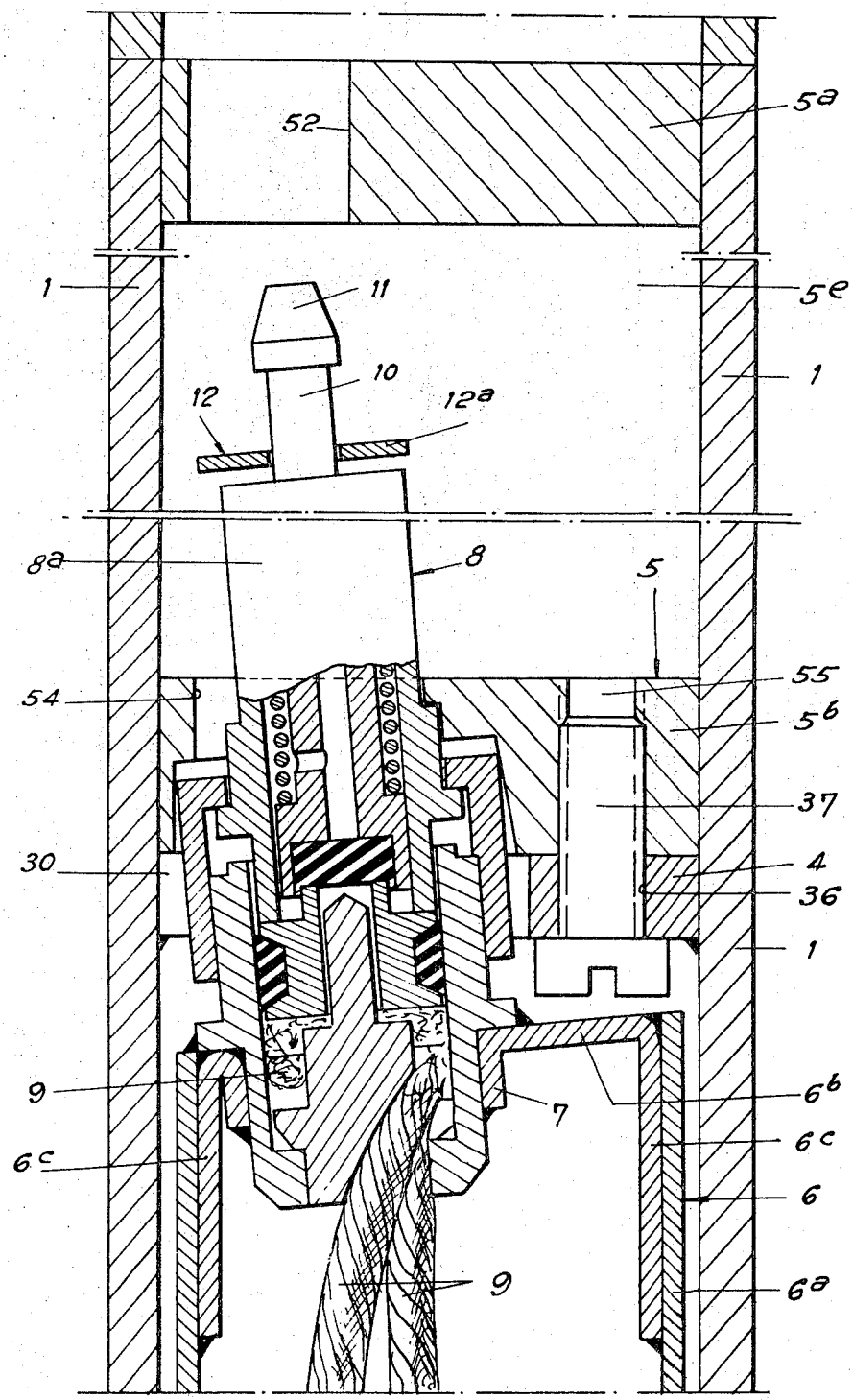

The partition 4 has a cut-out portion of circular-arc form 30 (FIG. 16) for the extension therethrough of the valve 8, which portion 30 communicates with an almost entirely circular cut-out 31 for the extension therethrough of a flint tube 32 (FIGS. 3 to 8), a square cut-out 33 for the extension therethrough of one end of each of two springs 34, 35 of which both serve to bring about the opening, and of which the spring 35 serves to bring about the closing, of the cap 2, and three circular holes 36 for the extension therethrough of screws 37 which are used to secure the platform 5 to the partition 4 (see also FIGS. 1, 3, 10 and 12). The spring 34 is coiled around a spindle 38 with the interposition of a collar 39, comprising a head 39a at one end (FIGS. 6, 7 and 10). One end 34a of the spring is fixed and rests against the upper face of the partition 4. The spring 35 is coiled around a spindle 40 carried by a fork-shaped part 41 (FIGS. 1, 6, 11 and 14), which is fixed to the platform 5 by a screw 42, and whose shape can be seen clearly from FIG. 11. One end 35a of the spring 35 is fixed and abuts against a suitable surface 43 of the platform 5 (FIGS. 1, 3 and 14).

The platform 5 has a shape which is best illustrated in FIGS. 18 to 22, although said platform appears in FIGS. 1 to 7 and 10 to 16. It comprises two horizontal shelves 5a, 5b and two parallel vertical webs 5c, 5d, joined together by a part 5e (FIGS. 1 to 5, 10, 12 to 14, 18, 19, 21 and 22). The webs 5c, 5d are pierced by horizontal holes 44 in axial alignment with one another (FIGS. 2, 18 and 21) to accommodate the spindles 22 of the guide-rollers 21, by a clearance notch 45 (FIGS. 6, 18 and 19), and by horizontal holes 46 in axial alignment with one another (FIGS. 7, 18 and 20) for the passage of the spindle 38 of the spring 34. In addition, they are each pierced by a vertical blind screw-threaded hole 47, opening onto the lower or underside face of the platform (FIGS. 1, 3, 7, 18 and 20) and aligned on assembly with one of the holes 36 of the partition 4 to receive the screw 37. One part of the web 5c is shaped as indicated by the lead line and the reference numeral 43 so as to serve as an abutment at the end 35a of the spring 35, as indicated previously. Each web 5c, 5d is pierced by one of the substantially straight or parallel-sided slots 28, the lower end portion 28a of each slot being very short in length but having a medial line which makes an obtuse angle with the medial line of the slot 28 (FIGS. 1, 3, 10, 14 and 18). Each slot 28 is adapted to accommodate one of the rollers 27 of the spindle 25 when the connecting links 23 pivot during the opening and closing of the cap 2. Finally, each web 5c, 5d has a seating 48 (FIGS. 1, 3 to 5, 10, 18, 19 and 22) to receive the brackets 14 which carry the spindle 13 of the valve lever 12 (FIGS. 1, 3 to 5 and 10) and said webs 5c, 5d are also pierced by screw-threaded aligned horizontal holes 49 which communicate with said seatings 48 (FIGS. 4, 5, 18, 19 and 22), said holes 49 being provided for the extension therethrough of the bracket screws 15.

The shelf 5a is pierced by a vertical hole 50 (FIGS. 3, 11, 14, 18, 21 and 22) for the extension therethrough of a driver-carrier 51 which will be discussed later (FIGS. 1 to 3, 11, 13, 14 and 26 to 29) and by a vertical hole 52 (FIGS. 1 to 3, 12 to 14, 18 and 21) for the passage of the flame issuing from the burner 11. The shelf 5b is pierced by a vertical hole 53 (FIGS. 3, 6, 7, 14, 18 to 20 and 22) for the extension therethrough of the flint tube 32, and by a vertical hole 54 (FIGS. 1, 4 to 7, 12, 19 and 20) for the valve 8. In addition, said shelf 5b is pierced by a screw-threaded vertical hole 55 (FIGS. 7, 12, 19 and 20) for one of the screws 37, and by a horizontal screw-threaded hole 56 (FIGS. 1, 7, 11, 18 to 20 and 22) for the screw 42.

The end of the connecting link 26 which is opposite the end thereof which is connected to the spindle 25 is fixed rigidly to the spindle 18 (FIGS. 1, 3, 6 and 11) which can move in slots 57 (FIGS. 1, 3, 11, 14, 23 and 24) formed in the arms 58a, 58b of a toothed sector 58 (FIGS. 1, 3 to 6, 11, 23 to 25) pivotally mounted on the spindle 40 carried by the part 41 (FIGS. 1, 6, 11 and 14), said spindle 40 extending through axially aligned holes 59 in said arms 58a, 58b.

The toothed sector 58 has the shape which is best seen in FIGS. 23 to 25 and consists of said two arms 58a, 58b joined together by the toothed sector proper 58c and a part 58d located below the sector 58c (FIGS. 1, 3 to 5, 14 and 23 to 25). The sector 58c is constituted by a section of a cylinder with its centre at the centre of the aligned holes 59. The teeth of the sector 58c engage with a pinion 60 (FIGS. 1, 3, 4 and 14) whose shape is clearly visible from FIG. 4 and which is constituted by a plate of suitable shape, pierced by a hole 61, circular except for a flat 61a, and into which the driver-carrier 51 is inserted with a force fit. The teeth of the pinion 60 are, approximately, formed in that edge of the plate which is remote from or opposite to the flat 61a.

Figure 13:
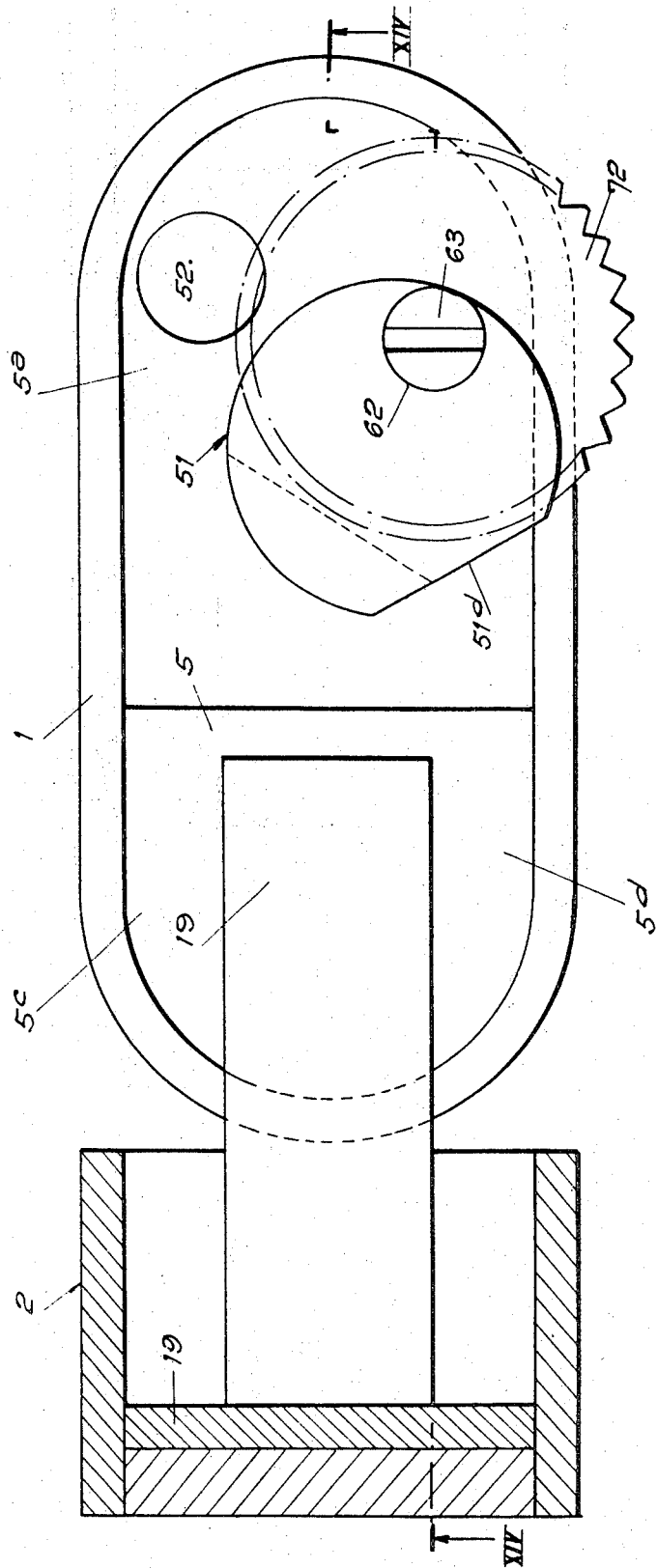
FIG. 13 is a section on the line XIII—XIII of FIG. 14.

The driver-carrier 51 is illustrated in detail on the FIGS. 26 to 29 and has (as seen in FIG. 26) a horizontal fork formed from cheeks 51a, 51b joined together by a vertical web 51c. Each of these cheeks has the shape, in plan, of a circle with the exception of a segment in the form of a chord 51d (FIGS. 2, 13 and 27). The upper cheek 51a is pierced by a hole 62 (FIGS. 2, 3, 13, 14 and 26) for the accommodation of the head of a spindle 63 for the flint-wheel (FIGS. 2, 3 and 13). The lower cheek 51b is likewise pierced by a hole 64 which is screw-threaded and which is centrally aligned with the hole 62 (FIGS. 3, 13, 26 and 27), for the passage of the lower threaded end of the spindle 63, and also by an opening 65 (FIGS. 3, 11, 14, 26, 27 and 29) for the accommodation of a flint 66 housed within the flint tube 32. From that face of the cheek 51b which is remote from the cheek 51a, there extends a cylindrical part 51e which is of smaller diameter than said cheeks and which likewise has a flat 51f which is not parallel to the flat 51d. The part 51e is pierced by a hole 67 which is of a diameter somewhat larger than that of the hole 65 (FIGS. 2 to 4, 11, 14 and 26 to 29) and which is centrally aligned with and which communicates with said hole 65, said hole 67 being provided to receive the flint tube 32. The flat 51f co-operates on assembly with the flat 61a of the hole 61. A circumferential groove 68 in the part 51e (FIGS. 3, 11, 14, 26, 28 and 29) serves to accommodate a clip 69 which, together with a washer 70 (FIGS. 3, 11 and 14), serves to attach the driver-carrier 51 to the pinion 60. Finally, the upper face of the cheek 51b has a small depression 71 (FIGS. 27 and 29) to facilitate the passage of the sparks struck from the flint 66.

A driver 72 (FIGS. 1 to 3, 11, 13 and 14) which carries a flint-wheel 73 is fitted in the driver-carrier 51 by means of the spindle 63. As the spindle 63 is mounted in the driver-carrier, eccentrically relative to the part 51e of the former, which serves as a pivot, the driver 72 which, in its rest position, is completely housed inside the body 1 of the lighter, projects partially outside this body when the driver-carrier 51 pivots, under the action of the pinion 60 and the toothed sector 58, in a manner which will be described more fully hereinafter.

The flint-wheel 73 is fitted in a cylindrical cavity 74 (FIGS. 1, 3, 11 and 14) which extends axially of the driver 72 from the lower face thereof and the lower face of said wheel 73 is serrated. It is pierced by a central hole 75 (FIGS. 3 and 14) for the extension therethrough of one end of the spindle 63, and it has an eccentric boss 73a which is a force-fit in a blind hole 76 in the driver 72. In this way, the flint-wheel is never in contact with the user's finger. This assembly, particularly advantageous though it is, does not in itself form part of the present invention.

Figure 8:
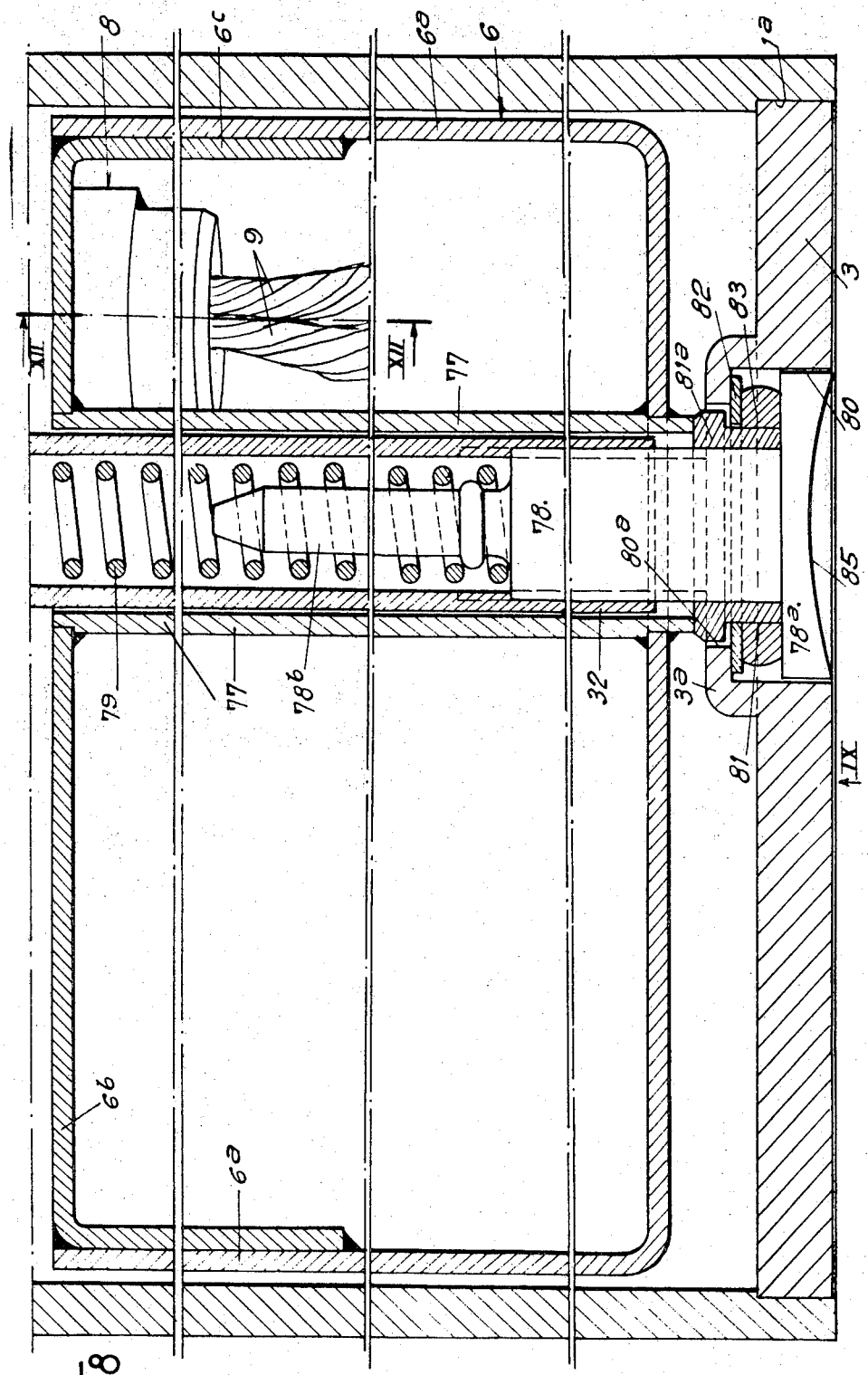
FIG. 8 is a vertical section on the line VIII—VIII of FIG. 7 showing the reservoir and the lower part of the lighter.
Figure 9:
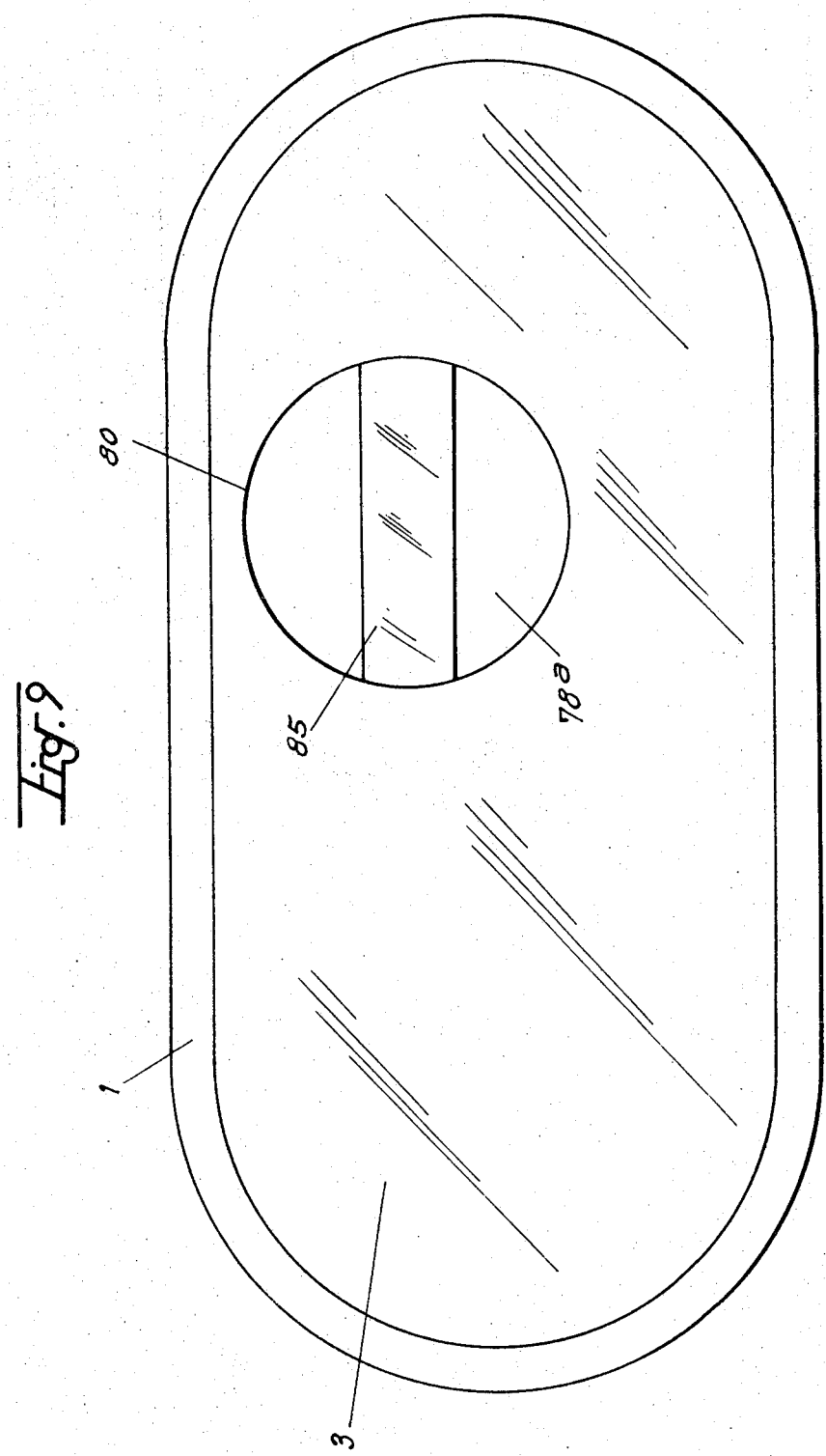
FIG. 9 is an inverted plan view of the lighter looking in the direction of the arrow IX.

The flint tube 32 occupies almost the entire height of the body 1 of the lighter and is fixed at a point near the middle of its length by a collar 32a (FIGS. 3 and 11) which extends into a counter bore 53a (FIGS. 3, 11, 14 and 22) in the bore 53 of the platform 5. Said tube 32 extends through the reservoir 6 through a spacer tube 77 which is concentric with said tube 32 and which is soldered in a leakproof manner to the top and the bottom of said reservoir. The lower end of said tube 32 is screw-threaded to receive a flint screw 78 (FIG. 8) whose upper face serves as an abutment for a flint spring 79 which presses the upper end of the flint 66 against the flint-wheel 73, and whose head 78a is housed in a bore 80 in the base 3 of the lighter body (FIGS. 8 and 9). This base has, above this bore and coaxial with it, an impressed boss 3a which, extending axially inwardly of the lighter as seen in FIG. 8, creates a concavity which constitutes an extension of said bore 80. Said boss 3a is pierced by a hole 80a for the extension therethrough of the screw 78 and of the head 81a of a collar 81 which is threaded over the screw 78 and whose head 81a is in contact with the lower end of the tube 77 which projects slightly below the bottom of the reservoir 6. A base washer 82 is threaded over the shank of the collar 81 and rests against the outwardly facing surface of the boss 3a and a pressure-loading washer 83 (for example, a spring- or Belleville-washer) is interposed between the head 78a of the flint screw and the base washer 82. Said washer 83 retains the base plate 3 in the seat 1a of the bottom end of the body 1 and the force which it can exert to separate the washer 82 and the head 78a is such that the head 78a is just flush with the outer surface of the base plate 3. At the same time, it allows complete freedom of movement to the flint screw 78 as well as to its collar 81.

Because of its great length, the spring 79 is centralised at its lower end by an extension 78b of the screw 78 (FIG. 8) and the flint 66 is not supported directly on the opposite end of the spring but rests upon a pallet 84 against which the upper end of said spring 79 abuts and which is extended downwardly to form a stem 84a which centralises the other end of the spring (FIGS. 3 and 11). The head 78a of the screw advantageously has a diametral slot 85 (FIGS. 8 and 9) for the introduction of a tool of some kind (for example, the edge of a coin) wherewith to turn the flint screw so as, inter alia, to regulate the height of the flame in a manner which is not a part of the present invention and which is not, therefore, described.

The manner of operation of the gas lighter described above is as follows:

With the cap 2 of the lighter closed, the springs 34 and 35 (which were tensioned during the closing of said cap) press upon the spindle 25 which extends through the ends of the connecting links 23. Consequently, as described in said patent application, when the user starts to open cap 2, the pivoting of the cover 2 under the action of the user's finger begins by pushing said links 23 up to their dead-centre positions, namely, the positions thereof in which the rollers 27 carried by said spindle are located in the bottoms 28a of the slots 28. Once these dead-centre positions are passed, the springs 34, 35 thrust the connecting links 23 up to the positions thereof illustrated in FIG. 14. The guide-rollers 21 carried by the webs 5c, 5d of the platform 5 roll in the curved grooves 20 of the block 19. The end 34b of the spring 34 accompanies the spindle 25 up to the end of its travel, whilst the spring 35 which is less powerful than the spring 34 only accompanies said spindle 25 during the first part of its travel, that is, until said spring 35 becomes fully unloaded (see FIG. 14). During opening of said cap 2, the ends 34a, 35a of the respective springs 34, 35 remain at rest on the partition 4 and the surface 43 of the web 5c, respectively.

However, since the connecting link 26 is pivotally connected at one end thereof to the spindle 25 and at the other end thereof to the spindle 18, the movement of the spindle 25 in the manner just described displaces the spindle 18 along the curved slot 57 to the position shown in FIG. 14, in which the connecting link 26, almost vertical at the commencement, has become almost horizontal. This pivoting of the connecting link 26 has two consequences. Firstly, the toothed sector 58 pivots about the axis of its spindle 40 under the action of the spindle 18 in the slot 57 and is caused to move from the position thereof illustrated in FIG. 1 to that illustrated in FIG. 14 and said pivoting of the toothed sector 58 causes the pinion 60 to turn since the teeth of these two components are in constant mesh. The pinion 60 connected to the driver-carrier 51 causes said driver-carrier to pivot about its axis of rotation (which is coincident with the axis of the cylindrical part 51e) with the result that the driver-carrier passes from the retracted position thereof (FIG. 2) to the exposed position thereof (FIG. 13). Stated differently, it projects slightly over the upper edge of the body 1 as clearly shown in FIG. 13 and, as a result of the interconnection of said driver-carrier 51 and said driver 72, the milled circumference of said driver is situated within reach of the user's thumb which has just completed the movement of opening of the cover 2 without said thumb needing to be raised above the body 1 of the lighter. It could thus be said that the movement which caused the lifting of the cover 2 is extended or is effectively prolonged and, acting upon the driver 72, causes the flint-wheel to rotate in contact with the flint 66 and to produce a shower of sparks which are directed horizontally in the direction of the hole 52 in the shelf 5a (FIGS. 12 and 13) by means of the depression 71 (FIGS. 27 and 29) in the lower cheek 51b of the driver-carrier 51.

But on the other hand the roller 17 carried on the spindle 18 has, due to the pivoting of the connecting link 26, moved into contact with that part of the valve lever 12 which is between the upwardly convex portion 12b thereof and the free end of said valve lever 12 and has lifted said lever to the position thereof shown in FIG. 14, thereby pivoting it in an anti-clockwise direction about the spindle 13 against the action of the spring 16. The obturator or plug of the valve 8 is thus opened and gas is permitted to pass from the reservoir 6 through the valve and to issue from the head 11 of the burner 10 and thence to pass through the hole 52 into the path of travel of the sparks produced by the rubbing of the flint against the serrated wheel and to be ignited thereby. Since the lifting of the valve lever 12 is, in practice, more rapid than the pivoting movement of the driver-carrier 51 which pivoting movement is followed by the user actuating the driver 72 by means of his or her thumb, gas will already have issued from said hole 52 by the time said sparks are struck. Experience has shown that ignition takes place perfectly and without any failure.

Once the cigarette is lit (or, in general, after using the lighter), the user will close the cap 2 with the aid of a finger or the thumb. This action initiates clockwise movement of said cap, which movement together with the weight of said cap causes the connecting links 23 to pivot as far as their dead-centre positions, and the toothed sector 58 is caused by the link 26 and the spindle 18 to reassume its former position (namely, that of FIG. 1) and thus to retract the driver-carrier within the confines of the cover 2. The valve lever 12, under the influence of the spring 16 which was tensioned by the anti-clockwise rotational movement of the lever 12, is moved in a clockwise manner about said spindle 13, thereby closing the obturator or plug of the valve 8 and the descending travel of the rollers 27 along the slots 28 tensions the springs 34 and 35. Having passed the dead-centre position, further movement of the spindle 25 carrying said rollers 28 is blocked by the combined actions of the spring 35, which becomes loaded as the connecting links 23 are moved towards the position thereof illustrated in FIGS. 1 and 3, and the spring 34 which also becomes loaded during said movement of said links 23 and which tends to force said rollers 27 against the respective junctions between the parts 28, 28a of the respective slots. That is to say, said combined actions of said springs tend to prevent the connecting links 23 from remaining in their dead-centre positions into which they were moved during closure of the cap 2. This blocking or locking effect is described in detail in said patent application.

It would be easy, furthermore, to render the lighter entirely automatic. It would be sufficient to employ the pivoting movement of the driver-carrier to cause the flint-wheel to turn, and to provide a ratchet or similar system to prevent rotation of the flint-wheel during the return movement of the driver-carrier.

In order to change the reservoir, the screw 78 is unscewed, the base plate 3 is removed and the reservoir 6 extracted. In this extracting movement, the valve lever 12 is pivoted downwardly (namely, in a clockwise direction as seen in FIGS. 1 and 3) about the axis of its spindle 13 under the influence of its spring 16, thereby disengaging the head 11 of the burner. Consequently, the lever 12 does not oppose the removal of the reservoir by engaging said head 11. When a full reservoir is inserted in place of the empty or faulty one, a part 8a (FIG. 12) of the valve lifts the lever 12 up to the position thereof shown in FIGS. 1 and 3. The forked end 12a straddles the stem 10 of the burner, and is thus correctly positioned to operate in the manner described above when the cap 2 is lifted or opened.

In order to change the flint, it is sufficient to unscrew the screw 78 and to insert a new flint, after the temporary removal of the spring 79, without any need to remove the base 3 of the lighter.

What I claim as my invention and desire to secure by Letters Patent of the United States is:

1. In a gas lighter having a gas-fuelled reservoir which carries an expansion valve which is operable by a pivotally mounted valve lever to permit the passage therethrough from said reservoir of a combustible gas which is ignitible by sparks produced by the rubbing of a serrated surface of a flint-wheel against a flint of which a part is held by a flint tube; said lighter further having a body; a cap; hinge mechanism connecting said body and said cap to one another, said hinge mechanism being invisible when the cap is in the closed condition thereof; said hinge mechanism comprising a first block fixed to said body, a second block fixed to said cap, two guide rollers carried by said first block, and curved guide grooves formed in said second block, each of said grooves being for the accommodation of and movement therealong of one of said rollers; two connecting links; one end of each of said links being pivotally connected to said second block; a first spindle, the other end of each of said links being connected to said first spindle; second and third spindles fixed to said first block, a spring coiled about said second spindle and a spring coiled about said third spindle; the improvement which consists in a third connecting link; one end of said third link being pivotally connected to said first spindle; a fourth spindle connected to the other end of said third link; a toothed sector pivotally mounted upon said third spindle; means defining a curved slot in said toothed sector, said fourth spindle extending through said curved slot; a toothed pinion; the teeth of said toothed sector being in constant mesh with those of said pinion; a driver-carrier pivotally mounted upon said first block; a driver carried by said driver-carrier; said flint-wheel being mounted in said driver; said pinion being fixed to said driver-carrier; a third roller carried by said fouth spindle; said pivotally mounted valve lever being so mounted upon a fifth spindle; a spring coiled around said fifth spindle and urging said lever against said third roller; said valve having a burner head and said valve lever having an operative connection with said burner head; said cap being openable to cause simultaneously said valve lever to lift said burner head to permit combustible gas to pass through said valve and said driver to move from a first position thereof which is occupied thereby when said cap is closed and in which said driver is both invisible and inaccessible to a second position thereof in which said driver is both visible and accessible for rotation manually.

2. A gas lighter as claimed in claim 1, wherein said first block includes two interconnected parallel webs and parallel first and second shelves which are connected to one another by said parallel webs; means defining aligned holes in said webs for the accommodation of the ends of said second spindle; means defining seats in said webs; support brackets located in said seats and secured to said webs; said brackets being aperture and journalling the ends of said fifth spindle; means defining two apertures in each of said webs and a guide roller spindle in each of said apertures; said guide rollers being journalled for rotation by said guide roller spindles.

3. A gas lighter as claimed in claim 2, wherein a partition is fixed to said body, said partition extending across the space bounded thereby and thereby driving said space into two parts; and fixing means securing said first block to said partition by extension through said second shelf.

4. A gas lighter as claimed in claim 1, wherein said toothed sector comprises two webs which are parallel to the two webs of said first block, said webs of said toothed sector being connected by a curved element whose radius of curvature has its centre coincident with the axis of rotation of said toothed sector; an edge of said curved element, said edge facing in the same direction as said axis of rotation; the teeth of said toothed sector being formed in said edge; said toothed pinion being a plate having at least one curved edge portion and the teeth of said pinion being formed in said curved edge portion.

5. A gas lighter as claimed in claim 1, wherein said driver-carrier includes an upper part having two parallel cheeks; said driver being located between said parallel cheeks of said driver-carrier; fixing means extending through said driver and connecting said driver to said driver-carrier cheeks, said driver being rotatable in said fixing means; and a lower part concentric with the upper part; means defining coaxial holes in said lower part, one of said holes accommodating that end of said flint tube which houses said flint and the other of said holes permitting contact between said flint and the serrated surface of said flint wheel; the two parts of the driver-carrier having, in planes perpendicular to the axis of rotation thereof, circular plan configurations except for flats; means defining a hole in said pinion, said hole being circular except for a flat; the flat of said upper part being, with said cap in the closed position thereof, parallel to one of the long sides of the section normal to the body of the lighter, whilst the flat of the lower part makes an angle with the flat of the upper part and mates with the flat of the hole in said pinion; a circumferential groove in said lower part; a clip in said circumferential groove securing the driver-carrier to the pinion; a portion of the lower part of said driver-carrier above said groove being cylindrical externally; means in said first block defining a cylindrical bore accommodating said cylindrical portion of said lower part; whereby the driver-carrier can pivot freely with the pinion relative to said first block when the toothed sector causes the pinion to rotate.

6. A gas lighter as claimed in claim 5, wherein said driver is cylindrical; means defining a cavity in one face of said driver, said cavity extending axially of said driver; said flint wheel being accommodated in said cavity.

7. A gas lighter as claimed in claim 1, wherein said spring coiled around said fifth spindle urges the valve lever downwardly in such a manner that the lever, when the cap is in the closed position thereof, is in contact with said valve below said burner head and coacts with said burner head only when the cap is in the open position thereof and so does not hinder replacement of the reservoir.

References Cited

UNITED STATES PATENTS

| 2,948,134 | 8/1960 | Quercia | 431—254X |
| 3,213,647 | 10/1965 | Sakamoto | 431—254X |

EDWARD J. MICHAEL, Primary Examiner

U.S. Cl. X.R.

431—254, 274